(12) United States Patent
Schreder et al.

(10) Patent No.: US 9,388,069 B2
(45) Date of Patent: Jul. 12, 2016

(54) COLOURED GLASSES

(71) Applicant: Schott AG, Mainz (DE)

(72) Inventors: Bianca Schreder, Sulzbach (DE); Ute Woelfel, Mainz-Laubenheim (DE); Ralf Biertuempfel, Mainz (DE); Stefanie Hansen, Gensingen (DE)

(73) Assignee: SCHOTT AG, Mainz (DE)

( * ) Notice: Subject to any disclaimer, the term of this patent is extended or adjusted under 35 U.S.C. 154(b) by 95 days.

(21) Appl. No.: 13/923,727

(22) Filed: Jun. 21, 2013

(65) Prior Publication Data

US 2013/0344343 A1 Dec. 26, 2013

(30) Foreign Application Priority Data

Jun. 22, 2012 (DE) .................. 10 2012 210 552

(51) Int. Cl.
| | |
|---|---|
| *C03C 4/02* | (2006.01) |
| *C03C 3/247* | (2006.01) |
| *C03C 3/17* | (2006.01) |
| *C03C 3/19* | (2006.01) |
| *C03B 5/00* | (2006.01) |
| *C03B 5/193* | (2006.01) |

(52) U.S. Cl.
CPC ... *C03C 4/02* (2013.01); *C03B 5/00* (2013.01); *C03B 5/193* (2013.01); *C03C 3/17* (2013.01); *C03C 3/19* (2013.01); *C03C 3/247* (2013.01)

(58) Field of Classification Search
None
See application file for complete search history.

(56) References Cited

U.S. PATENT DOCUMENTS

| | | | | |
|---|---|---|---|---|
| 4,217,382 | A * | 8/1980 | Toratani | 428/66.7 |
| 4,615,989 | A * | 10/1986 | Ritze | 501/44 |
| 5,249,076 | A * | 9/1993 | Fujiwara et al. | 359/350 |
| 5,286,683 | A * | 2/1994 | Aitken | 501/45 |
| 6,225,244 | B1 * | 5/2001 | Oguma | 501/45 |
| 2010/0321770 | A1 * | 12/2010 | Pyo et al. | 359/359 |
| 2012/0165178 | A1 * | 6/2012 | Ritter et al. | 501/44 |
| 2013/0105744 | A1 * | 5/2013 | Ogawa et al. | 252/587 |

FOREIGN PATENT DOCUMENTS

| | | |
|---|---|---|
| DE | 102004044282 | 3/2006 |
| DE | 102011056873 | 6/2012 |
| EP | 1714948 | 10/2006 |

OTHER PUBLICATIONS

Office Action dated Jun. 3, 2013 corresponding to German Patent Application No. 10 2012 210 552.2, 4 pp.

* cited by examiner

*Primary Examiner* — David Sample
(74) *Attorney, Agent, or Firm* — Ohlandt, Greeley, Ruggiero & Perle, LLP

(57) ABSTRACT

Coloured glasses are provided that include a following composition in percent by weight, based on oxide of:

| | |
|---|---|
| $P_2O_5$ | 25-75 |
| $Al_2O_3$ | 0.5-15 |
| MgO | 0-10 |
| CaO | 0-10 |
| BaO | 0-35 |
| SrO | 0-16 |
| $Li_2O$ | 0-12 |
| $Na_2O$ | 0-12 |
| $K_2O$ | 0-12 |
| CuO | 1-20 |
| $F/F_2$ | 0-20 |
| Sum RO (R = Mg, Ca, Sr, Ba) | 0-40 |
| Sum $R_2O$ (R = Li, Na, K) | 0.5-20. |

15 Claims, 2 Drawing Sheets

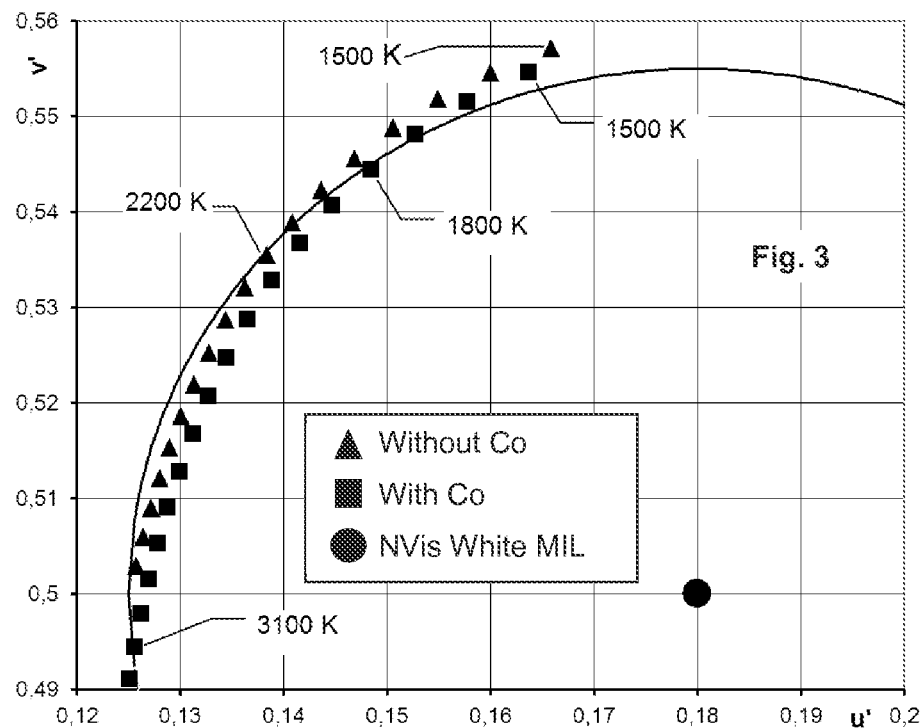
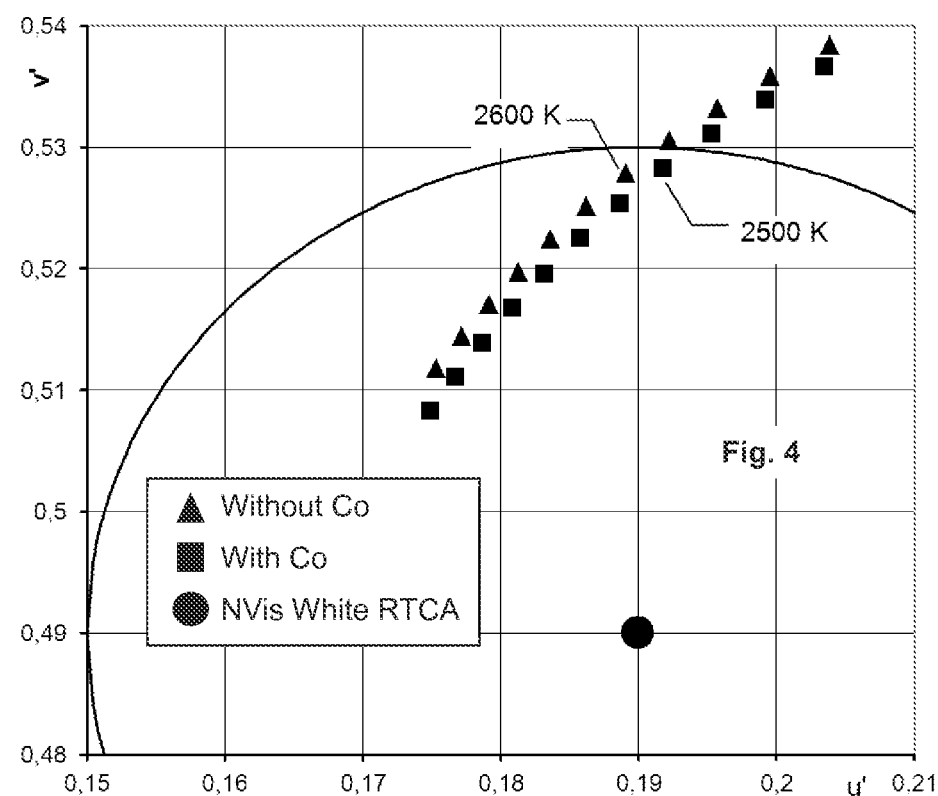

COLOURED GLASSES

CROSS REFERENCE TO RELATED APPLICATIONS

This application claims benefit under 35 U.S.C. §119(a) of German Patent Application No. 10 2012 210 552.2, filed Jun. 22, 2012, the entire contents of which are incorporated herein by reference.

BACKGROUND OF THE INVENTION

1. Field of the Invention

The present invention relates to coloured glasses, in particular (fluoro)phosphate glasses which are coloured blue for use as filter glasses, the use of such coloured glasses as filter glasses and a process for producing the glasses.

The glasses of the invention can be used as optical bandpass filters, i.e. as filters having a more or less narrow wavelength range of high transmission ("transmission range" or "passband") surrounded by two "barrier ranges" having very low transmission. Such glasses are used as optical glass filters, for example as colour correction filters in video cameras and digital cameras. Further fields of application are filters for blocking the NIR radiation of LEDs, e.g. in displays etc. Apart from a high transparency in the range from 350 to 650 nm, a "steep edge" in the adjoining UV and a very low transmission above 700 nm are typical of the glasses of the invention. NIR-blocking filters are also used in aviation/navigation, so that a certain colour position trueness is necessary in the case of high blocking (e.g. colour position white or green). While the UV range should preferably be completely blocked, for example to avoid damage to sensitive electronic arrangements by the high-energy radiation, the intensity of the incident radiation in the range above 700 nm should be attenuated, so that, for example when used in cameras, the red cast in the photograph caused by the CCD (charge-coupled device) sensor is compensated. This requires, for example, transmission values in the NIR of from about $10^{-5}$ to about $10^{-20}$ or about $10^{-22}$ at a fixed filter thickness.

2. Description of Related Art (Fluoro)phosphate glasses are known in principle from the prior art for use as filter glasses. However, these glasses have the disadvantage that they have poor weathering resistance and they are difficult to produce as a result of the often very high fluorine content because fluorine itself and the fluorides of many glass components are volatile under the conditions of conventional production processes. Many attempts have therefore been made to optimize the compositions of (fluoro)phosphate glasses with the objective of obtaining glasses which firstly have good stability and secondly can be obtained via economical production processes.

Furthermore, the need for very thin filters for which the glasses have to be more strongly coloured is increasing. However, this leads to problems in glass production since higher contents of colour-imparting components such as CuO have to be added for more strongly coloured glasses. However, at these higher amounts, these colour-imparting components not only act as colour-imparting components but, as glass constituents, also have an influence on other physical properties of the glass and the ability for the glass to be produced.

It is therefore an object of the present invention to provide coloured glasses which solve the problems of the prior art.

SUMMARY

The object can be achieved, in particular, by coloured glasses having the following composition (in % by weight, based on oxide, unless indicated otherwise):

| | |
|---|---|
| $P_2O_5$ | 25-75 |
| $Al_2O_3$ | 0.5-15 |
| MgO | 0-10 |
| CaO | 0-10 |
| BaO | 0-35 |
| SrO | 0-16 |
| $Li_2O$ | 0-12 |
| $Na_2O$ | 0-12 |
| $K_2O$ | 0-12 |
| CuO | 1-20 |
| $F/F_2$ | 0-20 |
| Sum RO (R = Mg, Ca, Sr, Ba) | 0-40 |
| Sum $R_2O$ (R = Li, Na, K) | 0.5-20 |

In an embodiment of the invention, referred to as the "high-copper or copper-rich embodiment", preference is given to a coloured glass which comprises the following composition (in % by weight based on oxide):

| | |
|---|---|
| $P_2O_5$ | 25-75 |
| $Al_2O_3$ | 0.5-15 |
| MgO | 0-10 |
| CaO | 0-10 |
| BaO | 0-35 |
| SrO | 0-16 |
| $Li_2O$ | 0-12 |
| $Na_2O$ | 0-12 |
| $K_2O$ | 0-12 |
| CuO | >7-20 |
| $F/F_2$ | 0-20 |
| Sum RO (R = Mg, Ca, Sr, Ba) | 0.1-40 |
| Sum $R_2O$ (R = Li, Na, K) | 0.5-20 |

In a further embodiment of the invention, referred to as the "low-copper embodiment", preference is given to a coloured glass which comprises the following composition (in % by weight based on oxide):

| | |
|---|---|
| $P_2O_5$ | 25-62 |
| $Al_2O_3$ | 0.5-15 |
| MgO | 0-10 |
| CaO | 0-10 |
| BaO | 0-35 |
| SrO | 0-16 |
| ZnO | — |
| $Li_2O$ | 0-12 |
| $Na_2O$ | 0-12 |
| $K_2O$ | 0-12 |
| $CeO_2$ | 0-<1 |
| CuO | 1-7 |
| CoO | 0.01-0.2 |
| $F/F_2$ | 0-20 |
| Sum RO (R = Mg, Ca, Sr, Ba) | 10-40 |
| Sum $R_2O$ (R = Li, Na, K) | 0.5-20 |

BRIEF DESCRIPTION OF THE DRAWINGS

As shown in FIG. 1, the term blocking is used to refer to the minimal transmission in the NIR range, while FIG. 2 shows the $T_{50}$ value, i.e. the wavelength at which the transmission in the near IR (NIR) range is exactly 50%.

FIGS. 3 and 4 show chromaticity diagrams CIE 1976, in particular a comparison of Examples 50 (Co-containing glass) and 51 (Co-free glass) comprising basically the same composition, with and without CoO.

DETAILED DESCRIPTION

Figure 1:
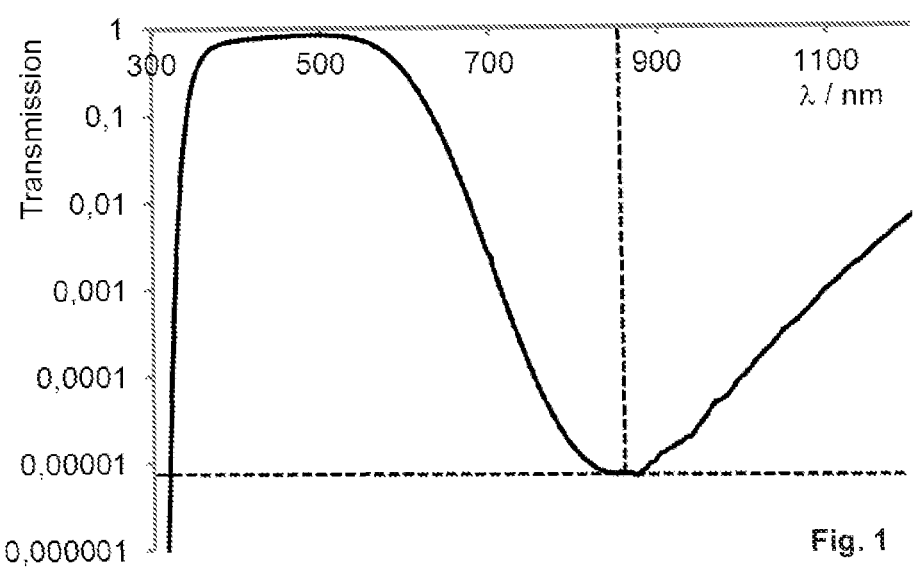
FIGS. 1 and 2 show the transmission curve of a glass according to the invention as per illustrative glass 17. Colour filter glasses for the above-described applications are, in contrast to other glasses, often characterized in terms of specific transmission properties, e.g. $T_{50}$ and blocking.
Figure 2:
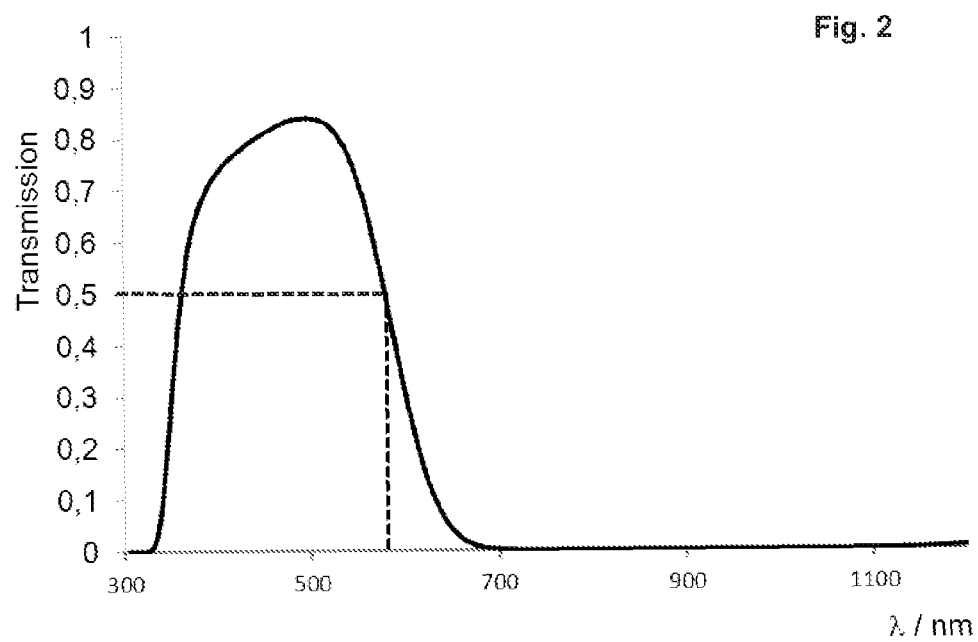

To the human eye, the glasses of the invention appear blue, blue-green, turquoise or cyan and are used, for example, as IR cut filters. The colours are subsidiary. Rather, it is the filter characteristics due to the absorption in the UV up to about 320 nm and in the near IR at about 850 nm brought about by the addition of the colour-imparting oxide CuO which is critical for use as filter in front of the sensor of digital cameras. The UV blocking is caused by the base glass itself and also CuO and can optionally be reinforced by addition of $CeO_2$.

The degree of $P^{5+}$-crosslinking of phosphate glasses describes the extent of crosslinking of the phosphorus atoms in the glass. Here, each $P^{5+}$ can be crosslinked by at most three oxygen atoms which can in turn form bonds via a further valence to the next phosphorus atom, i.e. contribute to the network. The fourth oxygen in the $PO_4$ tetrahedron is, due to the pentavalency of phosphorus, double-bonded to the phosphorus atom, so this oxygen cannot form a bond to other partners and thus not contribute to the network. In a network in which each phosphorus atom is in the oxidation state 5+ and is bound to three oxygen atoms which are available to form bonds to other bonding partners, the degree of crosslinking is 100%. A person skilled in the art will know of these circumstances.

In an embodiment of the invention, the degree of crosslinking of the glasses can be set to a value of at least 45%, particularly at least 65%, more particularly at least 68%, and according to specific embodiments at least 72%. The degree of crosslinking preferably is at most 90%, more preferably to at most 88%. This is effected, firstly, by selection of suitable components, and secondly also by possible introduction of oxygen, preferably oxygen having a purity of at least 99%, into the glass melt. This "bubbling" step makes it possible to adjust the redox ratio of the glass components to the side of higher valences, which has, inter alia, an advantageous effect on the filter characteristics. A side effect of bubbling is that a proportion of the fluorine is driven off from the glass. Firstly, fluorine is required for setting the filter characteristics (transmission) and secondly it increases the stability of the glass. The glass of the invention can, in particular, be produced by a process in which oxygen is bubbled into the melt in a batch melt, for example a crucible melt, for a time of from 10 to 40 minutes, preferably from 10 to 30 minutes. In the case of a continuous melt, for example a tank melt, bubbling is preferably also carried out continuously and preferably in the melting region of the tank. This bubbling should be carried out at temperatures above 900° C., preferably even above 925° C. and more preferably above 1000° C., with a temperature of 1200° C. preferably not being exceeded and in particularly preferred embodiments a temperature of at most 1100° C. not being exceeded. The flow rate of the oxygen in the case of, for example, a 30 litre crucible is preferably at least 40 l/h, more preferably at least 50 l/h, and also preferably at most 80 l/h and more preferably at most 70 l/h. If these parameters are adhered to, a glass according to the invention is obtained in the composition ranges indicated below. The production process described here is part of the present invention, like the glass which can be produced by the process.

In order for the increased weathering resistance of the glasses which is desired according to the invention to be able to be achieved, a particular molar ratio of phosphorus to oxygen has to prevail in the glasses. This molar ratio is, according to the invention, preferably at least 0.20, more preferably at least 0.25. This molar ratio is also preferably at most 0.40, more preferably at most 0.35, most preferably 0.31. If the molar ratio is, in connection with the concept of the filter glasses of the invention, set appropriately, a degree of crosslinking according to the invention can be achieved in the glass.

The degree of crosslinking can be determined by means of $^{31}$P-NMR analyses, in particular in a MAS (magic angle spinning) analysis. This measurement method is known to those skilled in the art.

As glass former, the content of phosphate in the glasses according to the invention is, at at least 25% by weight, relatively high. The upper limit to the phosphate content is at most 75% by weight, preferably at most 65% by weight. In preferred embodiments, the glasses of the present invention comprise at most 62% by weight of phosphate, more preferably at most 60% by weight. Particular embodiments comprise at least 27% by weight of phosphate.

Particular embodiments of the glasses of the invention comprise phosphate in amounts of more than 40% by weight. In these embodiments, the content of alkaline earth metal oxides should be at least 10% by weight and more preferably at least 15% by weight. In other embodiments, which have phosphate in amounts of less than 40% by weight, the content of alkaline earth metal oxides should be at least 25% by weight and more preferably at least 26% by weight and at most 40% by weight, preferably at most 38% by weight and more preferably at most 37% by weight.

Aluminium oxide $Al_2O_3$ is present in proportions of from 0.5 to 15% by weight in the glasses of the invention. In preferred embodiments, the glasses comprise at least 1% by weight of aluminium oxide. Particular preference is given to the content of aluminium oxide not being more than 13% by weight, more preferably at most 11% by weight, most preferably at most 10% by weight. An embodiment of the invention contains only at most 5% by weight, more preferably at most 3% by weight, of aluminium oxide.

To ensure sufficient stability of the glasses of the present invention, the proportion of the glass formers, i.e. of phosphate and aluminium oxide, should preferably together be more than 35% by weight. The sum of the two components is preferably at most 85% by weight, more preferably at most 70% by weight, even more preferably at most 65% by weight and most preferably at most 55% by weight.

Here, it has been found to be particularly advantageous to set the mass ratio of phosphate to aluminium oxide to a value of at least 3 and preferably at most 25. In further preferred embodiments, this value is at most 21.

To achieve a transmission of the glasses as required for use as IR cut filter, the oxides can be partially replaced by fluorides. However, the addition of fluoride ions always incurs the risk that fluorine will be given off from the mix during the production process. The amount of oxides replaced by fluorides must therefore not be too high. The glass of the invention can contain fluorine in a proportion of at most 20% by weight, preferably less than 15% by weight and according to particular embodiments less than 10% by weight, preferably at most 7% by weight or even at most 5% by weight. Preferred embodiments of the glass contain fluorine in a proportion of at least 1% by weight.

According to a further embodiment of the glass, the glass contains at least 1 anion-% and/or less than 20 anion-%, preferably at most 10 anion-%, according to one embodiment only at most 5 anion-%, of $F^-$. The glass preferably contains more than 80 anion-%, more preferably at least 90 anion-%, even more preferably at least 95 anion-%, and/or at most 99 anion-%, of $O^{2-}$.

Very different ratios of fluorine anions to oxygen anions can surprisingly be set in the glass system of the invention without the stability of the glass suffering. Thus, the fluorine to oxygen ratio in anion-% in the glass of the invention can e.g. be at least 0.005, in particular at least 0.01, more particularly at least 0.03, to at most 0.6, in particular at most 0.53, according to specific embodiments at most 0.25.

In glasses which have phosphate in proportions of more than 45% by weight, preference is given to up to 12% by weight of the oxide ions being replaced by fluoride ions, more preferably up to 10% by weight, particularly preferably 8% by weight. In glasses which have phosphate in amounts of less than 40% by weight, at least 9% by weight of the oxide ions are replaced by fluorides.

Owing to the abovementioned relationships, the fluoride ions and oxygen ions represent a mixture of anions whose composition has a great influence on the stability of the glasses of the invention. In particular, it is preferred according to the invention that the molar proportion of fluoride in this mixture does not exceed a value of 37%. In particularly preferred embodiments, this proportion is less than 25%, more preferably even less than 20% and most preferably less than 17%.

As mentioned at the outset, the glass of the invention is a blue filter glass. It therefore comprises copper oxide (CuO) in amounts of from 1 to 20% by weight as colour-imparting component. In an embodiment of the glass, referred to as the high-copper glass embodiment, the glass contains more than 7% by weight, preferably at least 10% by weight, of CuO. In another embodiment, known as the low-copper embodiment, the glass contains from 1 to 7% by weight of CuO. If copper oxide is used in amounts which are too low, the colour-imparting effect is insufficient for the purposes of the present invention. If a content of copper oxide which is too high is selected, the transmission of the glass is adversely affected.

Coloured glasses according to one embodiment of the present invention comprise cerium oxide ($CeO_2$) in amounts of at least 0.01% by weight, preferably at least 0.02% by weight, and less than 1% by weight, preferably at most 0.8% by weight, more preferably at most 0.6% by weight, most preferably at most 0.5% by weight. Some embodiments of the glass are free of cerium oxide. Cerium oxide increases the stability of the glass to UV radiation by absorbing in the UV range.

The position of the glass in the colour space can be set by means of an addition, as additional dopant, of a smaller amount of CoO, in particular a proportion of at least 0.01% by weight and/or at most 1.5% by weight, preferably 0.5% by weight, most preferably at most 0.2% by weight. Here, the absorption of cobalt is additionally superimposed on the absorption of CuO at from 470 nm and the colour position is therefore finely adjusted in the "white" or "green" direction. For the purposes of the present invention, a colour position is a circular region according to the formula $(u'-u'_1)^2 + (v'-v_1)^2 \leq (r)^2$, where u' and v' are the chromaticity coordinates of the test specimen and $u'_1$ and $v'_1$ are the chromaticity coordinates of the central point of the colour position and r is the radius of the permitted circular area of the CIE chromaticity diagram (cf. MIL STD 3009 or RTCA DO-275). E.g. according to MIL STD 3009, the colour position "green" is described by u'=0.088, v'=0.543 and r=0.037; and the colour position "white" is described by u'=0.190, v=0.49 and r=0.04. According to RTCA DO-275, e.g. the colour position "white" is described by u'=0.180, v=0.50 and r=0.055. FIGS. 3 and 4 show chromaticity diagrams CIE 1976 (2° standard colorimetric observer/$\Delta\lambda$=5 nm (380-780 nm)), of Examples 50 (CoO-free glass) and 51 (CoO-containing glass) comprising basically the same glass composition, however, with and without CoO relative to the colour position white. The measurements were conducted using planckian radiators. FIG. 3 shows a chromaticity diagram according to MIL STD 3009 (sample thickness 0.5 mm), FIG. 4 a chromaticity diagram according to RTCA DO-275 (sample thickness 1.4 mm)). In both diagrams it can be observed, that by the addition of CoO to the glass the colour position can be shifted closer to the colour position white. In particular, the CoO-containing glass delivers an acceptable colour position already using planckian radiators with a colour temperature of 1800 K, compared to 2200 K for the CoO-free glass. Thus the CoO-containing glasses e.g. are suitable for lamps with smaller light bulbs.

The sum of the contents of phosphate, alkali metal oxides and CuO is preferably at least 40% by weight, more preferably at least 50% by weight, even more preferably at least 60% by weight and most preferably at least 70% by weight, and/or preferably at most 95% by weight, more preferably at most 80% by weight.

The mass ratio of copper oxide (CuO) to phosphate ($P_2O_5$) can be set so that a value of at most 0.50, preferably at most 0.30, is achieved. The value should not go below at least 0.09. The inventors have found that the mass ratio of copper oxide to phosphate has a critical influence on the colour quality obtained. The amounts used should therefore be set so that the mass ratio described can be achieved. The lower limit to this mass ratio $CuO/P_2O_5$ should preferably be at least 0.1. The mass ratio of copper oxide to phosphate is preferably from 0.1 to 0.21.

The glass of the present invention comprises at least one alkali metal oxide $R_2O$. Alkali metal oxides function as the processing aids of the glass by acting as fluxes in the melt, i.e. they reduce the viscosity of the glass and lower the glass transition temperature. However, excessively large amounts of these oxides impair the stability of the glasses and increase the coefficient of expansion of the glass. If the latter is particularly high, the glass can no longer be optimally cold worked subsequently. Furthermore, the heat resistance and annealing of the glass in the cooling furnace is made more difficult. The total content of alkali metal oxides should therefore not fall below a value of at least 0.5% by weight, preferably at least 1% by weight. In order not to put the stability of the glass at risk, the sum of these oxides should not exceed a value of at most 20% by weight, preferably at most 18% by weight, in particular embodiments of the glass at most 15% by weight. According to the invention, preference is given to using lithium oxide ($Li_2O$), potassium oxide ($K_2O$) and sodium oxide ($Na_2O$). Glasses according to the invention preferably contain at least two representatives of the group consisting of the alkali metal oxides lithium oxide, potassium oxide and sodium oxide. It has been found to be advantageous to combine the alkali metal oxides sodium oxide and potassium oxide because this combination has a stabilizing effect in the sense of a mixed alkali effect on the glass.

The glasses of the invention can also comprise sodium oxide in amounts of at least 0.01% by weight, preferably at least 1% by weight and more preferably at least 2% by weight. The devitrification stability can be improved by means of this constituent. If it is used in amounts which are too low, this effect is not achieved. For stability considerations, a content of at most 12% by weight, preferably at most 10% by weight, more preferably at most 8% by weight and particularly preferably at most 6% by weight, should not be exceeded.

In preferred embodiments, the glasses of the invention comprise potassium oxide in amounts of at least 0.01% by weight and preferably at least 1% by weight. However, the content of potassium oxide should not exceed a value of at most 12% by weight, preferably at most 10% by weight, more preferably at most 9% by weight. Otherwise, the chemical resistance of the glass would be impaired to an excessive extent.

The glass of the invention can comprise lithium oxide in amounts of at least 0.05% by weight, more preferably 1% by weight. However, the content of this component should preferably not be above at most 12% by weight, because it has too great a tendency to vaporize, in particular when it is used together with relatively large amounts of fluoride. In preferred embodiments, the proportion of lithium oxide is therefore at most 10% by weight, more preferably at most 7% by weight, in particular at most 5% by weight. Embodiments of the glass are preferably free of lithium oxide.

According to the invention, the glasses preferably also comprise at least one alkaline earth metal oxide RO. Alkaline earth metal oxides serve to adjust the viscosity. Like the alkali metal oxides, they serve as network modifiers. Their content should not exceed a value of at most 40% by weight. The alkaline earth metal oxides of the present invention are preferably magnesium oxide (MgO), calcium oxide (CaO), barium oxide (BaO) and strontium oxide (SrO). In order to be able to set production-friendly viscosities, the content of the alkaline earth metal oxides should preferably not be below at least 10% by weight. In preferred embodiments, the content of alkaline earth metal oxides is at most 37.5% by weight, more preferably at most 35.5% by weight. The minimum content should preferably be not less than at least 0.1% by weight, more preferably at least 13% by weight, even more preferably at least 16% by weight.

In one embodiment, the alkaline earth metal oxides in the glass of the invention are selected so that the proportion by mass of barium oxide is greater than the proportion by mass of strontium oxide. Particular preference is given according to the invention to the sum of the proportions by mass of magnesium oxide and calcium oxide being at least 10% by weight. Further preference is given to the proportions by mass of magnesium oxide and calcium oxide together being a factor of at least 1.3 and more preferably at least 2.0 greater than the sum of the proportions by mass of barium oxide and strontium oxide.

The glasses of the invention preferably comprise at least two of the abovementioned alkaline earth metal oxides.

The content of magnesium oxide MgO is preferably at least 1% by weight, more preferably at least 1.5% by weight, and/or even more preferably at most 10% by weight, more preferably at most 9% by weight, even preferably at most 8% by weight.

The content of calcium oxide CaO is preferably at least 1% by weight, more preferably at least 1.5% by weight, and/or preferably at most 14% by weight, more preferably 10% by weight.

It has been found that in the case of high-copper coloured glasses it is advantageous for the sum of the content of calcium oxide and copper oxide to be at most 30% by weight, preferably at most 25% by weight. The minimum content of the sum is preferably at least 5% by weight, in one embodiment at least 10% by weight.

The content of barium oxide BaO is preferably at least 1% by weight, more preferably at least 2% by weight. The content of barium oxide is preferably at most 33% by weight, more preferably at most 30% by weight, in one embodiment at most 20% by weight. A further embodiment of the invention contains at most 5% by weight, more preferably at most 3% by weight, of BaO.

The content of strontium oxide SrO can preferably be at least 0.01% by weight. Greater preference is given to at most 15% by weight, more preferably at most 14% by weight. One embodiment of the glass is free of SrO.

In an embodiment, the ratio of the sum of $R_{20}$ (in % by weight) to the sum of RO (in % by weight), i.e. the ratio (sum $R_2O$ (in % by weight)/sum RO (in % by weight)), is at most 0.95, more preferably at most 0.7, even more preferably at most 0.65, and/or preferably at least 0.1, more preferably at least 0.2.

Zinc oxide ZnO serves to reduce the coefficient of expansion and thus increases the heat resistance and the ability of the glass to be annealed in the cooling furnace. Owing to the particular composition of the glasses of the present invention, zinc oxide can preferably be omitted according to the invention. If it is nevertheless used, the content should be at least 0.1% by weight and/or at most 10% by weight; according to a particular embodiment, the content is at most 5% by weight. According to a further embodiment, the glass is free of ZnO.

Like fluorine, boron oxide $B_2O_3$ tends to vaporize, so that the content of boron oxide should be very low. According to the invention, the boron oxide content is preferably at most 1% by weight. Particular preference is given to the boron oxide content being at most 0.5% by weight. In one embodiment, no boron oxide is added as glass component to the glass according to the invention.

Furthermore, the glass can contain at least one or more components selected from the group consisting of $Y_2O_3$, $Yb_2O_3$, $La_2O_3$ and $Gd_2O_3$ in order to improve the transmission in the blue and in the transmission range in the UV. The content of each one of these components is preferably at least 1% by weight, more preferably at least 2% by weight, most preferably at least 3% by weight. Such a component is present in the glass of the invention in a proportion of at most 10% by weight, more preferably at most 8% by weight, most preferably at most 7% by weight. However, preferred embodiments are free of rare earth metal oxides such as $Y_2O_3$, $Yb_2O_3$, $La_2O_3$ and $Gd_2O_3$.

In an embodiment of the present invention, the glass of the invention preferably consists to an extent of at least 90% by weight, more preferably at least 95% by weight, most preferably at least 99% by weight, of the abovementioned components.

In an embodiment, the glass consists to an extent of 90% by weight, preferably 95% by weight, more preferably 98% by weight, of the components $P_2O_5$, $Al_2O_3$, MgO, CaO, BaO, SrO, $Na_2O$, $K_2O$, CuO and F.

A specific embodiment of the glass comprises the following composition range (in cation-percent):

| | |
|---|---|
| $P^{5+}$ | 40-50 |
| $Al^{3+}$ | 0.5-5 |
| $Mg^{2+}$ | 5-15 |
| $Ca^{2+}$ | 5-15 |
| $Ba^{2+}$ | 1-5 |
| $Sr^{2+}$ | 0-5 |
| $Zn^{2+}$ | 0-1 |
| $Li^+$ | 0-<0.5 |
| $Na^+$ | 5-15 |
| $K^+$ | 5-15 |
| $Ce^{4+}$ | 0-<0.5 |
| $Cu^{2+}$ | 5-15 |
| $Co^{2+}$ | 0-1 |
| $F^-$ | 5-<15 |
| $\Sigma R^{2+}$ (R = Mg, Ca, Sr, Ba) | 15-25 |
| $\Sigma R^+$ (R = Li, Na, K) | 15-25 |

Refining is in the case of this glass preferably carried out primarily by physical refining, i.e. the glass is so fluid at the melting/refining temperatures that bubbles can rise.

The addition of refining agents promotes the release and uptake of oxygen in the melt. In addition, polyvalent oxides can modify the redox behaviour and thus promote the formation of Cu(II)O. The glass of the invention can therefore comprise conventional refining agents in small amounts. The sum of the refining agents added is preferably not more 1.0% by weight, more preferably at most 0.5% by weight. As refining agents, one or more of the following components can be present in the glass of the invention (in % by weight):

| | |
|---|---|
| $Sb_2O_3$ | 0-1 |
| $As_2O_3$ | 0-1 |
| SnO | 0-1 |
| NaCl | 0-1 |
| $SO_4^{2-}$ | 0-1 |
| inorganic peroxides | 0-1 |

As inorganic peroxides, it is possible to use, for example, zinc peroxide, lithium peroxide and/or alkaline earth metal peroxides.

In an embodiment of the present invention, the glass is $As_2O_3$-free, since this component is considered to be problematical for ecological reasons.

The glasses of the invention are preferably free of vanadium oxide ($V_2O_5$) because this oxide can have an adverse effect on the transmission properties of the glasses. For the same reason, the glasses are preferably free of iron oxide ($Fe_2O_3$); if alternative embodiments nevertheless contain iron oxide, the content of this is restricted to at most 0.25% by weight. $Fe_2O_3$ can be introduced as impurity into the glass by other components.

In preferred embodiments, the glasses of the invention do not comprise any further colouring oxides such as components of Cr, Mn and/or Ni and/or optically active, e.g. laser-active, components such as Pr, Nd, Sm, Eu, Tb, Dy, Ho, Er and/or Tm. In addition, the glass is preferably free of components which represent a hazard to health, e.g. oxides of Pb, Cd, Tl and Se, and also radioactive constituents.

Furthermore, the glass of the invention is preferably free of niobium oxide ($Nb_2O_5$) and/or zirconium oxide ($ZrO_2$).

In an embodiment of the present invention, the glass according to the invention is also preferably free of other components which are not mentioned in the claims or the description, i.e. according to such an embodiment the glass consists essentially of the abovementioned components, with individual components mentioned as not preferred or less preferred being able to be omitted. The expression "consist essentially of" means that other components are present at most as impurities but are not deliberately added as individual components to the glass composition.

If it is said in the present description that the glasses are free of a component or do not contain a certain component, this means that this component may be present at most as impurity in the glasses, that is to say that it is not added in significant amounts or not at all as glass component. Insignificant amounts are, according to the invention, amounts of less than 100 ppm, preferably less than 50 ppm and most preferably less than 10 ppm.

The coefficients of expansion measured for the temperature range from 20 to 300° C. $\alpha_{20-300}$ of the glasses of the invention are preferably in the range of at most $20\times10^{-6}$/K, more preferably at most $18\times10^{-6}$/K and in one embodiment at most $17\times10^{-6}$ per K. This avoids problems with thermal expansion in further processing and joining technology.

The glass of the invention has a good climate resistance or climate stability or weathering resistance. In particular, the glass can be subjected to a temperature of 85° C. and a relative atmospheric humidity of 85% for at least 400 hours, preferably at least 500 hours without the transmission properties being impaired by clouding of the surface.

The glasses of the invention preferably have a Knoop hardness of at least 350, more preferably at least 400.

A filter comprising the glass of the invention preferably has at least one coating on at least one side. This is preferably an antireflection (AR) and/or UV/IR cut coating. These layers reduce reflections and increase the transmission or reinforce IR blocking and make the absorption edge at about 650 nm steeper. These layers are interference layers. In the case of an antireflection layer, the glass has from 4 to 10 of these layers on at least one side. In the case of a UV/IR cut coating, preference is given to as many as from 50 to 70 layers. These layers preferably consist of hard metal oxides such as, in particular, $SiO_2$, $Ta_2O_3$, $TiO_2$ or $Al_2O_3$. These layers are preferably applied to various sides of the filter glass. Such coatings also increase the weathering resistance further.

A further aspect of the present invention is the process for producing the glasses according to the invention. If the steps described below are followed, the claimed glasses having the preferred degree of crosslinking can be obtained.

In the production of the glasses of the invention, complex phosphate is preferably added as raw material to the mix. The expression "complex phosphate" means that no phosphate in the form of "free" $P_2O_5$ is added to the mix, but instead other components such as $Na_2O$, $K_2O$, etc, are added not in oxidic or carbonate form but as phosphate, e.g. $Al(PO_3)_3$, $Ba(H_2PO_4)_2$, $Ca(H_2PO_4)_2$, $LiH_2PO_4$, $KPO_3$, $NaPO_3$, to the mix. This means that phosphate is added as anionic component of a salt, with the corresponding cation component of this salt itself being a glass constituent. This has the advantage that the proportion of complex phosphates increases at the expense of free $P_2O_5$, which can lead to good controllability in the melting process and significantly reduce vaporization and dusting effects, associated with better internal quality. In addition, an increased proportion of free phosphate makes increased demands on safety technology in the production operation, which increases production costs. The measure according to the invention considerably improves the processability of the glass composition: the vaporization and dusting tendency of the mix decrease drastically and significantly improved homogeneities of the glass are achieved, which is reflected, in particular, in the quality and homogeneity of the optical data of the glass formed. However, a generally improved internal quality of the glass in respect of, for example, bubbles and/or striae can be observed for the high-phosphate-containing material which is otherwise quite susceptible to striae because of its shortness.

Fluorine is preferably introduced into the glass in the form of fluorides such as $AlF_3$, LiF, NaF, KF, $MgF_2$, $CaF_2$, $SrF_2$.

The alkali metal oxides and alkaline earth metal oxides can also be introduced as carbonates.

The glass of the invention is melted from a uniform, previously well-mixed mix of the appropriate composition in a batch melting apparatus, e.g. Pt crucible, or continuous melting apparatus such as an AZS ($Al_2O_3$—$ZrO_2$—$SiO_2$) tank, Pt tank or fused silica tank at temperatures of from 930 to 1100° C., then refined and homogenized. During melting of the glass, the components present in the crucible or tank material can be introduced into the glass, i.e. after melting in a fused silica tank, up to 2% by weight of $SiO_2$ can be present in the glass, even if this has not explicitly been added. The melting temperatures depend on the composition selected. Oxygen is preferably bubbled through the glass to set the redox ratio in the melt. Bubbling should preferably be carried out for from 10 to 40 minutes or, in the case of a continuous melting process, continuously. This bubbling also serves to homogenize the melt. In addition to the above-described effects, bubbling also aids the formation of a degree of crosslinking according to the invention.

The refining of the glass is preferably carried out at from 950 to 1100° C. The temperatures generally have to be kept low in order to keep the vaporization of the volatile components such as fluorine, $Li_2O$ and $P_2O_5$ as low as possible.

The invention also provides for the use of glasses according to the invention as filter glasses, in particular IR cut glasses, the use of these glasses for protecting CCDs in cameras and the use of the glasses in NVis applications, for example for safety/aviation, night vision applications and the like.

EXAMPLES

TABLE 1

Melting example for 100 kg of calculated glass (as per Example 7)

| Raw material | Weight used | Oxide/F | % by weight |
|---|---|---|---|
| Phosphorus pentoxide | 1.821 | $P_2O_5$ | 51.71 |
| Boric acid | 0.739 | $B_2O_3$ | 0.11 |
| Copper oxide | 12.630 | CuO | 13.71 |
| Arsenic trioxide | 0.009 | $As_2O_3$ | 0.02 |
| Aluminium metaphosphate | 13.303 | $Al_2O_3$ | 2.96 |
| Sodium fluoride | 5.626 | $Na_2O$ | 5.09 |
| Potassium metaphosphate | 15.268 | $K_2O$ | 7.43 |
| Magnesium fluoride | 7.802 | MgO | 5.8 |
| Monocalcium phosphate | 34.755 | CaO | 6.93 |
| Calcium fluoride | 2.585 | F– | 3.22 |
| Monobarium phosphate | 5.462 | BaO | 2.98 |

To produce 100 kg of a coloured glass having the composition of Example 7, as per the synthesis in Table 1, a glass mix is intensively mixed. This mix is melted at 950° C. over a period of about 3 hours and oxygen is bubbled through the melt for about 30 minutes. Refining is likewise carried out at 950° C. because of the low viscosity. After standing for from about 15 to 30 minutes, the glass is cast at a temperature of about 940° C.

FIG. 1 shows the transmission spectrum of a glass according to the invention (Example 17) and demonstrates that these glasses have excellent filter properties. This is based on a thickness of the specimen of 0.1 mm.

The glasses have a Knoop hardness HK of from 350 to 450 and are thus readily processable and at the same time sufficiently scratch resistant. The coefficients of expansion are in the range from $13 \times 10^{-6}$/K to $16 \times 10^{-6}$/K, measured for the temperature range from 20 to 300° C. The glass transition temperatures of the glasses $T_g$ are from about 350 to 450° C.

TABLE 2

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| $P_2O_5$ | 58.25 | 30.80 | 44.56 | 46.38 | 32.89 | 54.33 | 51.74 | 28.86 |
| $Al_2O_3$ | 2.88 | 9.34 | 2.55 | 2.66 | 5.95 | 3.29 | 2.96 | 8.84 |
| $B_2O_3$ | 0.17 | 0.04 | 0.00 | 0.00 | 0.00 | 0.05 | 0.11 | 0.00 |
| MgO | 5.20 | 1.91 | 5.97 | 6.21 | 2.15 | 6.37 | 5.80 | 2.26 |
| CaO | 7.39 | 4.18 | 3.50 | 6.42 | 2.72 | 8.04 | 6.93 | 3.78 |
| BaO | 2.93 | 13.85 | 13.17 | 13.70 | 28.02 | 3.27 | 2.98 | 11.87 |
| SrO | 0.00 | 10.05 | 0.01 | 0.01 | 0.01 | 0.01 | 0.01 | 12.48 |
| $Li_2O$ | 1.92 | 2.23 | 1.71 | 1.78 | 5.74 | 2.10 | 0.00 | 3.83 |
| $Na_2O$ | 4.68 | 0.00 | 5.95 | 6.19 | 4.62 | 5.55 | 5.09 | 0.00 |
| $K_2O$ | 0.03 | 0.00 | 4.99 | 5.19 | 0.00 | 0.00 | 7.43 | 0.00 |
| $As_2O_3$ | 0.01 | 0.01 | 0.02 | 0.02 | 0.02 | 0.02 | 0.02 | 0.02 |
| $CeO_2$ | 0.00 | 0.25 | 0.00 | 0.00 | 0.00 | 0.00 | 0.00 | 0.00 |
| CuO | 15.18 | 13.98 | 13.70 | 7.41 | 10.47 | 14.41 | 13.71 | 13.51 |
| CoO | 0.00 | 0.00 | 0.00 | 0.00 | 0.00 | 0.00 | 0.00 | 0.00 |
| $F/F_2$ | 1.36 | 13.36 | 3.87 | 4.03 | 7.41 | 2.56 | 3.22 | 14.55 |
| Sum | 100 | 100 | 100 | 100 | 100 | 100 | 100 | 100 |
| $T_{50}$(1 mm)/nm | 536 | 521 | 532 | 557 | — | 540 | 538 | 536 |
| Blocking (1 mm) | 9.90E–19 | 7.10E–20 | 9.80E–20 | 1.30E–10 | 5.30E–20 | 6.40E–20 | 9.20E–20 | 1.50E–20 |
| Degree of crosslinking/% | 90.00 | 51.70 | 87.00 | 87.20 | 66.81 | 87.86 | 87.64 | 49.83 |

TABLE 3

|  | Ex. 9 | Ex. 10 | Ex. 11 | Ex. 12 | Ex. 13 | Ex. 14 | Ex. 15 | Ex. 16 |
|---|---|---|---|---|---|---|---|---|
| $P_2O_5$ | 36.06 | 37.22 | 44.30 | 46.09 | 29.76 | 51.58 | 53.16 | 51.72 |
| $Al_2O_3$ | 6.53 | 6.74 | 2.43 | 2.53 | 8.94 | 2.85 | 2.94 | 2.81 |
| $B_2O_3$ | 0.00 | 0.00 | 0.00 | 0.00 | 0.05 | 0.05 | 0.05 | 0.05 |
| MgO | 2.71 | 2.80 | 5.95 | 6.19 | 2.26 | 5.78 | 5.96 | 6.40 |
| CaO | 1.91 | 1.97 | 3.40 | 3.53 | 3.79 | 6.79 | 7.00 | 6.79 |
| BaO | 21.32 | 22.00 | 12.85 | 13.37 | 12.39 | 2.94 | 3.04 | 0.00 |
| SrO | 0.03 | 0.03 | 0.03 | 0.03 | 12.37 | 0.01 | 0.01 | 2.98 |
| $Li_2O$ | 2.16 | 2.22 | 1.85 | 1.93 | 4.43 | 0.00 | 0.00 | 0.00 |
| $Na_2O$ | 3.80 | 3.92 | 5.96 | 6.20 | 0.00 | 5.08 | 5.24 | 4.80 |
| $K_2O$ | 7.23 | 7.46 | 4.99 | 5.19 | 0.01 | 7.49 | 7.72 | 7.51 |
| $As_2O_3$ | 0.02 | 0.02 | 0.02 | 0.03 | 0.02 | 0.02 | 0.03 | 0.03 |

TABLE 3-continued

|  | Ex. 9 | Ex. 10 | Ex. 11 | Ex. 12 | Ex. 13 | Ex. 14 | Ex. 15 | Ex. 16 |
|---|---|---|---|---|---|---|---|---|
| $Sb_2O_3$ | 0.00 | 0.00 | 0.00 | 0.00 | 0.00 | 0.00 | 0.00 | 0.01 |
| $CeO_2$ | 0.00 | 0.00 | 0.00 | 0.00 | 0.22 | 0.00 | 0.00 | 0.00 |
| CuO | 11.50 | 8.68 | 14.08 | 10.60 | 10.70 | 13.64 | 10.97 | 14.13 |
| CoO | 0.00 | 0.00 | 0.00 | 0.00 | 0.05 | 0.00 | 0.00 | 0.00 |
| $F/F_2$ | 6.73 | 6.94 | 4.14 | 4.31 | 15.01 | 3.77 | 3.88 | 2.77 |
| Sum | 100 | 100 | 100 | 100 | 100 | 100 | 100 | 100 |
| $T_{50}$(1 mm)/nm | 527 | 541 | — | 535 | — | 532 | 544 | — |
| Blocking (1 mm) | 4.70E−20 | 7.30E−15 | 4.30E−20 | 7.80E−15 | 1.10E−15 | 7.60E−20 | 1.20E−15 | — |
| Degree of crosslinking/% | 36.06 | 37.22 | 44.30 | 46.09 | 29.76 | 51.58 | 53.16 | 51.72 |

TABLE 4

|  | Ex. 17 | Ex. 18 | Ex. 19 | Ex. 20 | Ex. 21 | Ex. 22 | Ex. 23 | Ex. 24 |
|---|---|---|---|---|---|---|---|---|
| $P_2O_5$ | 57.00 | 68.35 | 67.47 | 54.29 | 23.02 | 23.02 | 24.32 | 35.80 |
| $Al_2O_3$ | 5.16 | 8.85 | 9.43 | 3.07 | 4.61 | 4.61 | 4.87 | 7.82 |
| $B_2O_3$ | 0.22 | 0.00 | 0.00 | 0.02 | 0.00 | 0.00 | 0.00 | 0.00 |
| MgO | 0.23 | 0.36 | 0.00 | 6.66 | 0.00 | 0.00 | 0.00 | 3.05 |
| CaO | 0.81 | 1.28 | 1.38 | 8.03 | 0.03 | 0.03 | 0.03 | 4.12 |
| BaO | 7.73 | 5.01 | 5.46 | 3.10 | 29.88 | 29.88 | 31.57 | 28.74 |
| SrO | 0.02 | 0.01 | 0.00 | 0.00 | 15.10 | 15.10 | 15.96 | 0.01 |
| $Li_2O$ | 2.15 | 1.27 | 1.46 | 0.00 | 0.00 | 0.00 | 0.00 | 5.38 |
| $Na_2O$ | 5.26 | 0.45 | 0.48 | 5.29 | 1.01 | 1.01 | 1.07 | 4.46 |
| $K_2O$ | 11.24 | 5.99 | 6.49 | 7.84 | 0.00 | 0.00 | 0.00 | 0.00 |
| $Y_2O_3$ | 0.00 | 0.00 | 0.00 | 0.00 | 6.56 | 0.00 | 6.93 | 0.00 |
| $Yb_2O_3$ | 0.00 | 0.00 | 0.00 | 0.00 | 0.00 | 0.00 | 0.00 | 1.78 |
| $La_2O_3$ | 0.00 | 0.00 | 0.00 | 0.00 | 0.00 | 6.56 | 0.00 | 0.00 |
| $As_2O_3$ | 0.01 | 0.01 | 0.01 | 0.01 | 0.01 | 0.01 | 0.01 | 0.01 |
| CuO | 7.53 | 7.89 | 7.21 | 8.76 | 7.48 | 7.48 | 2.24 | 2.30 |
| CoO | 0.20 | 0.04 | 0.01 | 0.06 | 0.00 | 0.00 | 0.00 | 0.00 |
| $F/F_2$ | 2.44 | 0.49 | 0.60 | 2.87 | 12.30 | 12.30 | 13.00 | 6.53 |
| Sum | 100 | 100 | 100 | 100 | 100 | 100 | 100 | 100 |
| $T_{50}$(1 mm)/nm | 611 | 609 | 613 | 604.3 | 608 | — | — | — |
| Blocking (1 mm) | — | — | — | — | — | — | — | — |
| Degree of crosslinking/% | 82.92 | 79.46 | 78.05 | 88.43 | 58.74 | 58.76 | 59.02 | 64.14 |

TABLE 5

|  | Ex. 25 | Ex. 26 | Ex. 27 | Ex. 28 | Ex. 29 | Ex. 30 | Ex. 31 |
|---|---|---|---|---|---|---|---|
| $P_2O_5$ | 30.87 | 29.88 | 39.41 | 38.31 | 48.04 | 46.47 | 30.92 |
| $Al_2O_3$ | 9.49 | 9.17 | 7.14 | 6.95 | 2.64 | 2.56 | 9.29 |
| $B_2O_3$ | 0.00 | 0.00 | 0.00 | 0.00 | 0.00 | 0.00 | 0.05 |
| MgO | 2.42 | 2.34 | 2.97 | 2.89 | 6.46 | 6.25 | 2.35 |
| CaO | 7.92 | 7.66 | 2.09 | 2.03 | 6.57 | 6.36 | 7.81 |
| BaO | 12.74 | 12.32 | 23.32 | 22.69 | 13.94 | 13.49 | 12.89 |
| SrO | 13.39 | 12.94 | 0.04 | 0.03 | 0.04 | 0.03 | 12.86 |
| $Li_2O$ | 4.11 | 3.97 | 2.36 | 2.29 | 2.01 | 1.94 | 4.61 |
| $Na_2O$ | 0.00 | 0.00 | 4.16 | 4.04 | 6.46 | 6.25 | 0.00 |
| $K_2O$ | 0.00 | 0.00 | 7.91 | 7.69 | 5.42 | 5.24 | 0.01 |
| $As_2O_3$ | 0.02 | 0.02 | 0.03 | 0.03 | 0.03 | 0.03 | 0.02 |
| $CeO_2$ | 0.00 | 0.00 | 0.00 | 0.00 | 0.00 | 0.00 | 0.23 |
| CuO | 3.35 | 6.54 | 3.19 | 5.84 | 3.86 | 6.98 | 3.26 |
| CoO | 0.08 | 0.07 | 0.02 | 0.05 | 0.03 | 0.05 | 0.09 |
| $F/F_2$ | 15.61 | 15.09 | 7.36 | 7.16 | 4.50 | 4.35 | 15.61 |
| Sum | 100 | 100 | 100 | 100 | 100 | 100 | 100 |
| $T_{50}$(1 mm)/nm | 583 | 560 | 579 | 557 | 580 | 557 | 563 |
| Blocking (1 mm) | 2.40E−05 | 5.30E−10 | 1.20E−05 | 5.80E−10 | 1.10E−05 | 6.10E−10 | 3.90E−05 |
| $T_{50}$(3 mm)/nm | 630 | — | 630 | — | 630 | — | 630 |
| Degree of crosslinking/% | 49.83 | 49.80 | 68.16 | 68.11 | 87.30 | 87.28 | 50.12 |

TABLE 6

|  | Ex. 32 | Ex. 33 | Ex. 34 | Ex. 35 | Ex. 36 | Ex. 37 |
|---|---|---|---|---|---|---|
| $P_2O_5$ | 54.48 | 52.85 | 48.14 | 35.76 | 53.05 | 33.13 |
| $Al_2O_3$ | 3.01 | 2.92 | 2.76 | 6.48 | 3.04 | 10.05 |
| $B_2O_3$ | 0.05 | 0.05 | 0.00 | 0.00 | 0.11 | 0.05 |
| MgO | 6.11 | 5.93 | 6.46 | 2.34 | 5.96 | 2.06 |
| CaO | 11.98 | 11.63 | 6.68 | 2.96 | 11.78 | 8.36 |
| BaO | 3.11 | 3.02 | 14.25 | 30.53 | 3.06 | 14.90 |
| SrO | 0.01 | 0.01 | 0.01 | 0.01 | 0.01 | 10.82 |
| $Li_2O$ | 0.00 | 0.00 | 1.85 | 6.26 | 0.00 | 2.40 |
| $Na_2O$ | 5.37 | 5.21 | 6.43 | 5.03 | 5.23 | 0.00 |
| $K_2O$ | 7.92 | 7.68 | 5.40 | 0.00 | 7.64 | 0.00 |
| $As_2O_3$ | 0.03 | 0.03 | 0.03 | 0.03 | 0.02 | 0.01 |
| $CeO_2$ | 0.00 | 0.00 | 0.00 | 0.00 | 0.00 | 0.26 |
| CuO | 3.89 | 6.72 | 3.74 | 2.44 | 6.72 | 3.55 |
| CoO | 0.06 | 0.08 | 0.06 | 0.09 | 0.07 | 0.03 |
| $F/F_2$ | 3.98 | 3.87 | 4.19 | 8.07 | 3.31 | 14.38 |
| Sum | 100 | 100 | 100 | 100 | 100 | 100 |
| $T_{50}$(1 mm)/nm | 565 | 561 | 566 | 540 | 561 | 582 |
| Blocking (1 mm) | 1.50E−05 | 6.40E−10 | 1.50E−05 | 7.10E−05 | 8.00E−10 | 2.80E−05 |
| $T_{50}$(3 mm)/nm | 630 | — | 630 | 623 | — | 630 |
| Degree of crosslinking/% | 90.90 | 90.89 | 90.38 | 75.13 | 90.70 | 63.83 |

TABLE 7

|  | Ex. 38 | Ex. 39 | Ex. 40 | Ex. 41 | Ex. 42 | Ex. 43 | Ex. 44 |
|---|---|---|---|---|---|---|---|
| $P_2O_5$ | 56.95 | 56.03 | 54.82 | 61.27 | 34.60 | 29.88 | 56.95 |
| $Al_2O_3$ | 3.51 | 3.39 | 3.14 | 3.09 | 6.27 | 8.98 | 3.51 |
| $B_2O_3$ | 0.05 | 0.05 | 0.12 | 0.18 | 0.00 | 0.05 | 0.05 |
| MgO | 6.80 | 6.58 | 6.16 | 5.57 | 2.27 | 2.27 | 6.80 |
| CaO | 13.39 | 12.96 | 12.17 | 12.69 | 2.87 | 7.54 | 13.39 |
| BaO | 3.49 | 3.38 | 3.16 | 3.14 | 29.52 | 12.45 | 3.49 |
| SrO | 0.01 | 0.01 | 0.01 | 0.00 | 0.01 | 12.43 | 0.01 |
| $Li_2O$ | 2.25 | 2.17 | 0.00 | 2.06 | 6.05 | 4.45 | 2.25 |
| $Na_2O$ | 5.92 | 5.73 | 5.40 | 5.01 | 4.87 | 0.00 | 5.92 |
| $K_2O$ | 0.00 | 0.00 | 7.89 | 0.03 | 0.00 | 0.01 | 0.00 |
| $As_2O_3$ | 0.03 | 0.02 | 0.03 | 0.01 | 0.03 | 0.02 | 0.03 |
| $CeO_2$ | 0.00 | 0.00 | 0.00 | 0.00 | 0.00 | 0.22 | 0.00 |
| CuO | 3.87 | 6.98 | 3.66 | 4.40 | 5.66 | 6.54 | 3.87 |
| CoO | 1.00 | 0.05 | 0.02 | 1.10 | 0.04 | 0.07 | 1.00 |
| $F/F_2$ | 2.73 | 2.65 | 3.42 | 1.45 | 7.81 | 15.08 | 2.73 |
| Sum | 100 | 100 | 100 | 100 | 100 | 100 | 100 |
| $T_{50}$(1 mm)/nm | 583 | 564 | 581 | 582 | 523 | 544 | 583 |
| Blocking (1 mm) | 1.40E−05 | 9.60E−10 | 1.50E−05 | 1.20E−05 | 1.30E−10 | 7.80E−10 | 1.40E−05 |
| $T_{50}$(3 mm)/nm | 630 | — | 630 | 630 | 623 | — | 630 |
| Degree of crosslinking/% | 87.71 | 87.90 | 87.63 | 89.78 | 66.81 | 50.02 | 87.71 |

TABLE 8

|  | Ex. 45 | Ex. 46 | Ex. 47 | Ex. 48 | Ex. 49 | Ex. 50 | Ex. 51 |
|---|---|---|---|---|---|---|---|
| $P_2O_5$ | 56.03 | 54.83 | 63.72 | 63.65 | 74.45 | 55.88 | 56.08 |
| $Al_2O_3$ | 3.39 | 3.14 | 4.01 | 4.06 | 8.70 | 3.16 | 2.96 |
| $B_2O_3$ | 0.05 | 0.12 | 1.20 | 1.30 | 0.00 | 0.05 | 0.15 |
| MgO | 6.58 | 6.16 | 0.00 | 0.00 | 0.00 | 6.85 | 6.82 |
| CaO | 12.96 | 12.17 | 0.70 | 0.70 | 0.00 | 8.26 | 8.23 |
| BaO | 3.38 | 3.16 | 5.08 | 5.08 | 0.00 | 3.18 | 3.28 |
| SrO | 0.01 | 0.01 | 0.00 | 0.00 | 0.00 | 0.00 | 0.00 |
| ZnO | 0.00 | 0.00 | 0.41 | 0.01 | 0.00 | 0.00 | 0.00 |
| $Li_2O$ | 2.17 | 0.00 | 3.50 | 3.60 | 2.70 | 0.00 | 0.00 |
| $Na_2O$ | 5.73 | 5.40 | 4.20 | 4.24 | 0.32 | 5.43 | 5.28 |
| $K_2O$ | 0.00 | 7.89 | 3.17 | 3.15 | 0.00 | 8.05 | 8.02 |
| $As_2O_3$ | 0.02 | 0.03 | 0.20 | 0.20 | 0.00 | 0.03 | 0.03 |
| $Sb_2O_3$ | 0.00 | 0.00 | 0.01 | 0.01 | 0.13 | 0.01 | 0.01 |
| $CeO_2$ | 0.00 | 0.00 | 0.00 | 0.00 | 0.00 | 0.00 | 0.00 |
| CuO | 6.98 | 3.66 | 13.80 | 14.00 | 13.70 | 6.15 | 6.13 |

TABLE 8-continued

|  | Ex. 45 | Ex. 46 | Ex. 47 | Ex. 48 | Ex. 49 | Ex. 50 | Ex. 51 |
|---|---|---|---|---|---|---|---|
| CoO | 0.05 | 0.02 | 0.00 | 0.00 | 0.00 | 0.00 | 0.03 |
| F/F$_2$ | 2.65 | 3.42 | 0.00 | 0.00 | 0.00 | 2.95 | 3.04 |
| Sum | 100 | 100 | 100 | 100 | 100 | 100 | 100 |
| T$_{50}$(1 mm)/nm | 564 | 581 | 564 | 565 | 563 | — | — |
| Blocking (1 mm) | 9.60E−10 | 1.50E−05 | 1.30E−09 | 7.30E−10 | 5.90E−13 | — | — |
| T$_{50}$(3 mm)/nm | — | 630 | 602 | 604 | 610 | — | — |
| Degree of crosslinking/% | 87.90 | 87.63 | 85.07 | 84.62 | 81.35 | — | — |

What is claimed is:

1. A coloured glass comprising a composition in percent by weight based on oxide of:

| P$_2$O$_5$ | 25- at most 62 |
|---|---|
| Al$_2$O$_3$ | 0.5- 15 |
| MgO | 0- 10 |
| CaO | 0- 14 |
| BaO | 0- 35 |
| SrO | 0- 16 |
| Li$_2$O | 0- 12 |
| Na$_2$O | 0- 12 |
| K$_2$O | 0- 12 |
| CuO | >7- 20 |
| Sum F (F = F, F$_2$) | 1- 20 |
| Sum RO (R = Mg, Ca, Sr, Ba) | 0.1- 40 |
| Sum R$_2$O (R = Li, Na, K) | 0.5- 20, and | a sum of content of calcium oxide and copper oxide from 10 to 30% by weight.

2. The coloured glass according to claim 1, comprising a sum proportion of RO of at least 10% by weight.

3. The coloured glass according to claim 1, comprising a sum proportion of RO of at least 10% by weight.

4. The coloured glass according to claim 1, wherein the glass is free of one or more elements selected from the group consisting of ZnO, ZrO$_2$, V$_2$O$_3$ Nb$_2$O$_5$, Fe$_2$O$_3$ and Li$_2$O.

5. The coloured glass according to claim 1, wherein the glass has a degree of crosslinking of at most 50%.

6. The coloured glass according to claim 1, further comprising a mass ratio of CuO to P$_2$O$_5$ of at most 0.5 and not below 0.09.

7. A coloured glass comprising a composition in percent by weight based on oxide of:

| P$_2$O$_5$ | 25- at most 62 |
|---|---|
| Al$_2$O$_3$ | 0.5- 15 |
| MgO | 0- 10 |
| CaO | 0- 14 |
| BaO | 0- 35 |
| SrO | 0- 16 |
| Li$_2$O | 0- 12 |
| Na$_2$O | 0- 12 |
| K$_2$O | 0- 12 |
| CeO$_2$ | 0.01- <1 |
| CuO | 1- 7 |
| CoO | 0.01- 0.2 |
| Sum F (F = F, F$_2$) | 1- 20 |
| Sum RO (R = Mg, Ca, Sr, Ba) | 10- 40 |
| Sum R$_2$O (R = Li, Na, K) | 0.5- 20. |

8. The coloured glass according to claim 7, comprising a sum proportion of RO of at least 10% by weight.

9. The coloured glass according to claim 7, comprising a sum proportion of RO of at least 10% by weight.

10. The coloured glass according to claim 7, wherein the glass is free of one or more elements selected from the group consisting of ZnO, ZrO$_2$, V$_2$O$_3$ Nb$_2$O$_5$, Fe$_2$O$_3$ and Li$_2$O.

11. The coloured glass according to claim 7, wherein the glass has a degree of crosslinking of at most 50%.

12. The coloured glass according to claim 7, further comprising a sum of content of calcium oxide and copper oxide from 10 to 30% by weight.

13. The coloured glass according to claim 7, further comprising a mass ratio of CuO to P$_2$O$_5$ of at most 0.5 and not below 0.09.

14. A filter comprising a coloured glass comprising a composition in percent by weight based on oxide of:

| P$_2$O$_5$ | 25-75 |
|---|---|
| Al$_2$O$_3$ | 0.5-15 |
| MgO | 0-10 |
| CaO | 0-14 |
| BaO | 0-35 |
| SrO | 0-16 |
| Li$_2$O | 0-12 |
| Na$_2$O | 0-12 |
| K$_2$O | 0-12 |
| CuO | 1-20 |
| Sum F (F = F, F$_2$) | 1-20 |
| Sum RO (R = Mg, Ca, Sr, Ba) | 0-40 |
| Sum R$_2$O (R = Li, Na, K) | 0.5-20, | wherein the glass has a degree of crosslinking of at most 50%.

15. The filter according to claim 14, further comprising a coating on at least one of its surfaces.

* * * * *